Patented Sept. 15, 1936

2,054,100

UNITED STATES PATENT OFFICE 2,054,100

PREPARATION OF POLYCYCLIC AROMATIC MONOCARBOXYLIC ACIDS

Norman D. Scott and Joseph Frederic Walker, Niagara Falls, N. Y., assignors to E. I. du Pont de Nemours & Company, Inc., Wilmington, Del., a corporation of Delaware No Drawing. Application November 23, 1934, Serial No. 754,500

6 Claims. (Cl. 260—108)

This invention relates to the preparation of organic acids and more particularly to the preparation of carboxyl derivatives of alicyclic aromatic hydrocarbons.

Carboxyl derivatives of partially hydrogenated polycyclic aromatic hydrocarbons may be prepared by reacting an alkali metal with a polycyclic aromatic hydrocarbon in a suitable solvent medium to form an alkali metal hydrocarbon addition product and subsequently reacting said addition product with carbon dioxide to produce the alkali metal salt of the corresponding carboxyl derivative. For example, if naphthalene is reacted with sodium in this manner, a disodium naphthalene addition compound having the empirical formula $C_{10}H_8Na_2$ is formed. This addition product is soluble in the solvent medium in which it is formed, causing a green color therein. Similar alkali metal addition compounds of other polycyclic aromatic hydrocarbons may be formed by substantially the same treatment; all these addition products are more or less soluble in the solvent mediums used and their presence is indicated by a distinct coloration of the solvent. If the colored solution of the alkali metal addition compound is treated with carbon dioxide, the color is discharged and the sodium salt of the corresponding carboxyl derivative is precipitated. For example, when disodium naphthalene ($C_{10}H_8Na_2$) is reacted with carbon dioxide, the product is an isomeric mixture of the sodium salts of acids having the formula $C_{10}H_8(COOH)_2$. This acid, which may be termed "dihydronaphthalene dicarboxylic acid", is the dicarboxyl derivative of dihydronaphthalene. It probably occurs in two isomeric forms which may be represented by the graphic formulas:

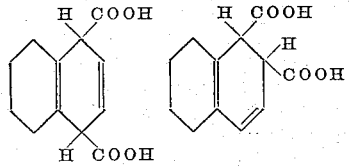

The free acid may be recovered by filtering off the sodium salts and treating them with a suitable strong acid, e. g., hydrochloric or sulfuric acid. The various polycyclic aromatic hydrocarbons are suitable for carrying out these reactions, for example naphthalene, diphenyl, phenanthrene, anthracene and others, to produce similar carboxyl derivatives.

The formation of the alkali metal addition compounds of the polycyclic aromatic hydrocarbons is described by Schlenk, Liebig's Annalen, volume 463, pages 90 and 95. The methods of carrying out these reactions using certain ingredients as solvent media which facilitate the reaction of sodium and other alkali metal hydrocarbons is described in the copending U. S. patent application by Norman D. Scott, Serial Number 638,524. Methods of preparing these carboxyl derivatives of partially hydrogenated polycyclic aromatic hydrocarbon are described and claimed in the co-pending applications, Norman D. Scott, Serial No. 638,524 and J. F. Walker, Serial No. 741,731.

An object of this invention is to convert the above mentioned carboxyl derivatives of partially hydrogenated polycyclic aromatic hydrocarbons to aromatic carboxyl acids. A further object is to provide a method for preparing monocarboxyl derivatives of polycyclic aromatic hydrocarbons. A still further object is to provide a novel method for preparing naphthoic acids. Other objects will be apparent from the following description of our invention.

We have discovered that the dicarboxyl derivatives of partially hydrogenated polycyclic aromatic hydrocarbons may be converted to monobasic aromatic acids by oxidation in the presence of a cyanide. For example, in accordance with our invention, the compound dihydronaphthalene 1,4-dicarboxylic acid may be converted to alpha-naphthoic acid. The oxidation treatment is carried out in an aqueous solution of a soluble cyanide compound. We prefer to use as oxidizing agent an alkaline solution of a double cyanide of a heavy metal capable of existing in more than one state of valence, said metal being in a higher state of valence. Hereinafter, for the sake of brevity, we designate these complex cyanides by the term "metallicyanides". Examples of metallicyanides suitable for practicing our herein described invention are the soluble ferricyanides, e. g. sodium or potassium ferricyanide and the soluble cobalticyanides, e. g., potassium or ammonium cobalticyanide.

In one method of preparing a monobasic, aromatic acid in accordance with our invention, the dicarboxy derivative of a partially hydrogenated polycyclic hydrocarbon is dissolved in an alkaline solution, for example a solution of an alkali metal hydroxide and to this is added a suitable amount of a soluble ferricyanide, e. g. potassium ferricyanide. The solution then is heated, preferably at a temperature of about 80 to 100° C. until the reaction is complete, which may require several hours. The product then may be recovered by any suitable means, for example by neutralizing the solution with strong acid and filtering off the precipitated product. The purity of the product will depend mainly upon the degree of oxidation attained; if desired, the product may be purified by fractional crystallization from alcohol or other solvent or by other known means. By this method, we have converted dihydronaphthalene-1,4-dicarboxylic acid to alpha-naphthoic acid. We have also prepared beta-naphthoic acid from dihydronaphthalene-1,2-dicarboxylic acid by the same method. Likewise, we have prepared similar monobasic aromatic acids from similar dihydrodicarboxy derivatives of other polycyclic aromatic hydrocarbons, for example diphenyl, phenanthrene, anthracene and acenaphthene. In each case, the hydrocarbon may be reacted with alkali metal (e. g. sodium) to form the metal addition compound, the dicarboxylic acid formed by reacting the alkali metal addition compound and the dibasic acid oxidized to a monobasic aromatic acid by the herein described method. The following tabulation lists examples of monobasic acids produced by our method, and shows their derivation from the polycyclic aromatic hydrocarbons.

| Hydrocarbon | Monobasic aromatic acid |
| --- | --- |
| Diphenyl | p-Phenyl benzoic acid ($C_6H_5$-$C_6H_4$-COOH) |
| Phenanthrene | 4-Carboxy phenanthrene acid ($C_{14}H_9$-COOH) |
| Anthracene | Anthracene-9-carboxylic acid |
| Acenaphthene | Acenaphthene carboxylic acid |

Our invention is illustrated more specifically by the following examples:

Example 1

1,4-Dihydronaphthalene dicarboxylic acid (21.8 gms.) was dissolved in 200 cc. of a solution of potassium hydroxide containing about 40 gms. of KOH. To this solution was added 66 gms. of potassium ferricyanide dissolved in an additional 200 cc. of water and the mixture was heated on a steam bath for about 6 hours. The mixture then was cooled and treated with sufficient hydrochloric acid solution to neutralize the free alkali and precipitate the product. The product was filtered off, washed with water and purified by dissolving in alkali, filtering the solution and reprecipitating with hydrochloric acid. By melting point, (163° C.) and other tests, the product was identified as alpha-naphthoic acid. Yield was approximately 81% of the theoretical.

Example 2

An alkaline solution was made by dissolving 875 gms. of potassium hydroxide in 4 liters of water and to this was added 617 gms. of a dihydronaphthalene dicarboxylic acid which consisted mainly of the 1,2 isomer. A solution of 1980 gms. of potassium ferricyanide in 4 liters of water was mixed with the first mentioned solution and the mixture was heated on a steam bath for five hours. The mixture then was cooled, whereupon the sodium salt of beta-naphthoic acid crystallized out. The crystals were filtered off and the filtrate was evaporated to obtain a further crop of the crystals of the same substance. The crystals of sodium beta-naphthoate were dissolved in water and beta-naphthoic acid precipitated from this solution by the addition of hydrochloric acid. By acidifying the reaction mixture with hydrochloric acid after the sodium beta-naphthoate had been removed, a precipitate of alpha-naphthoic acid was obtained. The total yield of mixed naphthoic acids was 75% of the theoretical; yield of the beta-naphthoic acid was 63% and that of the alpha-naphthoic acid, 12%.

Example 3

A dihydrodicarboxyl derivative of phenanthrene was obtained by reacting phenanthrene and sodium in dimethyl ether and carboxylating the resulting disodium addition compound by reaction with carbon dioxide in the dimethyl ether solvent. The dihydrodicarboxy derivative of phenanthrene was oxidized with ferricyanide by the method of Example 1. After purification by crystallizing from methanol and benzene, the product was found to be 4-carboxy phenanthrene, a hitherto unknown substance. 4-carboxy phenanthrene is a white crystalline substance, having a melting point of 219 to 220° C. and a neutralization equivalent of 222. By the term neutralization equivalent we mean the amount (grams) of the substance which will be neutralized by one liter of a one normal solution of an alkali.

We claim:

1. A process for preparing aromatic organic acids comprising treating a dihydrodicarboxy derivative of a polycyclic aromatic hydrocarbon in which the carboxy groups are attached to hydrogenated carbon atoms with an aqueous solution of a double cyanide of a heavy metal capable of existing in more than one state of valence, said metal being in a state of higher valence.

2. A process for preparing monobasic aromatic organic acids comprising oxidizing dihydronaphthalene dicarboxylic acid in which the carboxy groups are attached to hydrogenated carbon atoms with an aqueous solution of a double cyanide of a heavy metal capable of existing in more than one state of valence, said metal being in a state of higher valence.

3. A process for preparing monobasic aromatic organic acids comprising treating a dihydrodicarboxy derivative of a polycyclic aromatic hydrocarbon in which the carboxy groups are attached to hydrogenated carbon atoms with an aqueous solution of a ferricyanide.

4. A process for preparing naphthoic acid comprising treating dihydronaphthalene dicarboxylic acid in which the carboxy groups are attached to hydrogenated carbon atoms with an aqueous solution of a ferricyanide.

5. As a new composition of matter, 4-carboxy phenanthrene, a white, crystalline acidic substance having a melting point of about 220° C. and a neutralization equivalent of 222.

6. A process for preparing 4-carboxy phenanthrene comprising oxidizing dihydrodicarboxy phenanthrene in which the carboxy groups are attached to hydrogenated carbon atoms with an aqueous solution of a ferricyanide.

NORMAN D. SCOTT.
JOSEPH FREDERIC WALKER.